Feb. 24, 1925.
N. A. ARMSTRONG
MUSICAL INSTRUCTION DEVICE
Filed Nov. 17, 1922  2 Sheets-Sheet 2
1,527,824
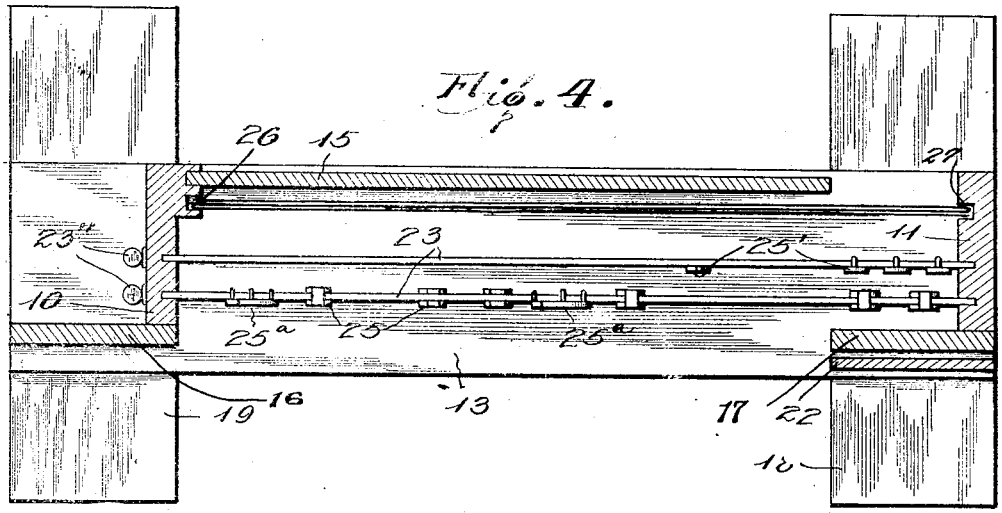
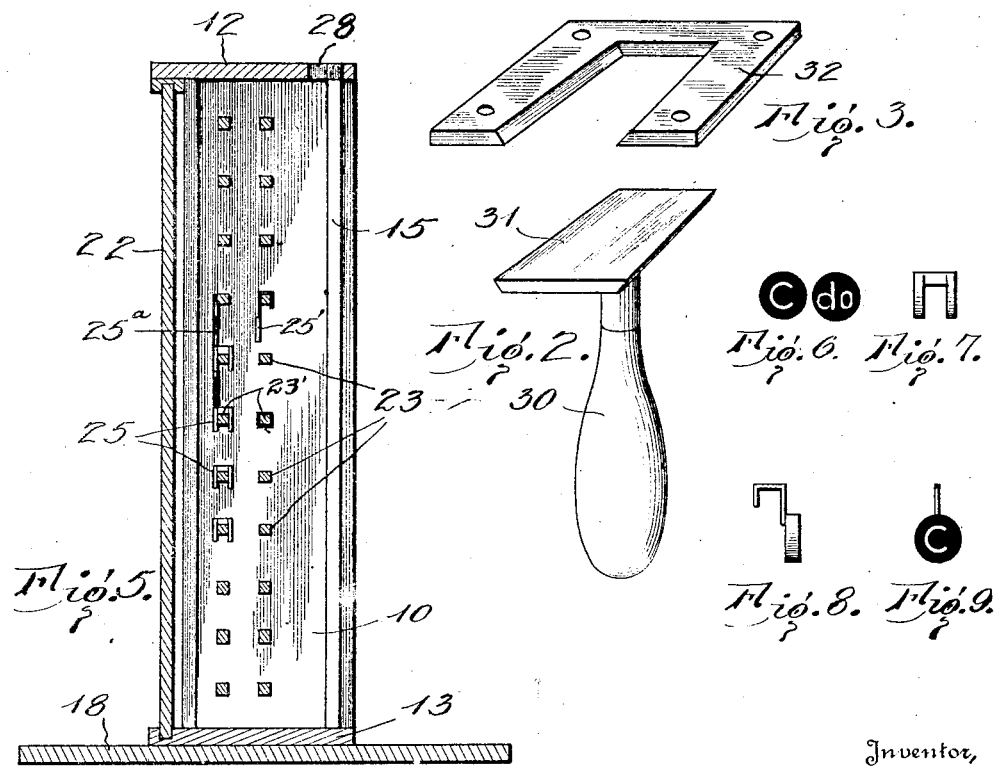
Inventor,
Nancy A. Armstrong.
By Walter W Burns
Attorney Patented Feb. 24, 1925.

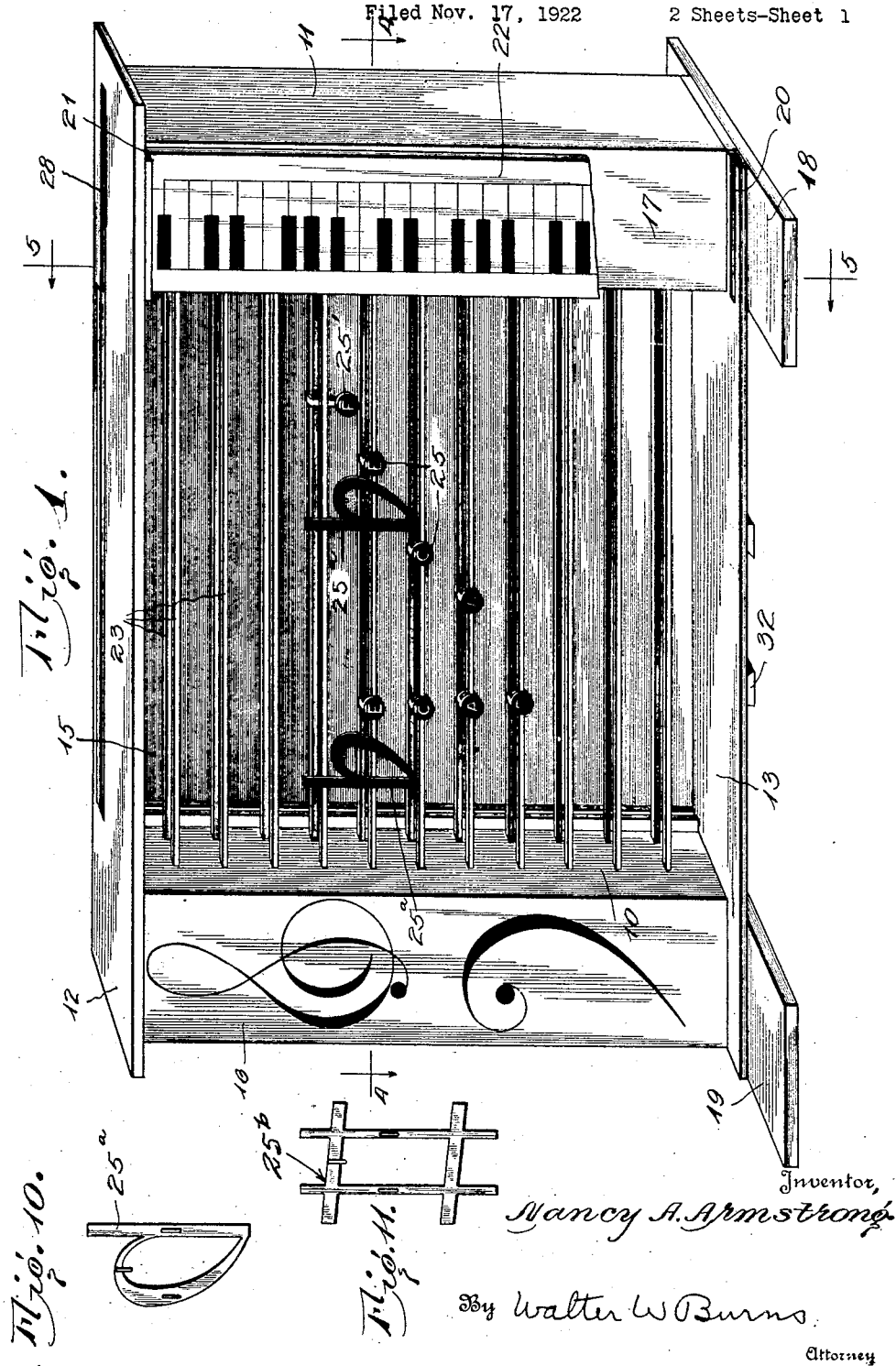

1,527,824

UNITED STATES PATENT OFFICE.

NANCY A. ARMSTRONG, OF NEW YORK, N. Y.

MUSICAL-INSTRUCTION DEVICE.

Application filed November 17, 1922. Serial No. 601,663.

*To all whom it may concern:*

Be it known that I, NANCY A. ARMSTRONG, residing in the borough of Manhattan, city and State of New York, a citizen of the United States, have invented certain new and useful Improvements in Musical-Instruction Devices, of which the following is a specification.

This invention relates to musical educational devices and particularly to devices for teaching music on keyboard instruments.

It has been found that, in teaching music, in the writing of scales, chords, phrases, etc., by pupils during their exercises, a great deal of time is consumed in the actual process of indicating the characters with a pencil or otherwise, the amount of time consumed depending upon the pupil and his or her aptitude in the use of the pencil. It has also been found that the writing of notes, etc., during instruction is difficult for the teacher.

The primary object of my invention is the provision of a musical staff in the form of a species of abacus having movable markers indicating different notes and signs, and, having portions indicating the lines and spaces of the grand or bass and treble staffs, so that chords, etc., can be more quickly built up, thus saving much time.

Another object of my invention is the provision of a musical staff in the form of a species of abacus having movable markers indicating different notes and signs and having portions indicating the lines of a grand staff opposite to and in registry with indications of a portion of a keyboard of a musical instrument as a piano.

Another and further object of my invention is the provision of a musical staff abacus wherein the note indicating elements when not in use may be stored in the frame and in such a manner as to be practically if not entirely invisible.

Referring to the drawings wherein I have illustrated a preferred embodiment,

Fig. 1 is a perspective view of my device as a whole,

Figs. 2 and 3 are detail views of the handle and its securing means,

Fig. 4 is a horizontal cross sectional view of my device on the line 4—4 of Fig. 1, Fig. 5 is a vertical section on the line 5—5 of Fig. 1, Figs. 6 and 7 are detail views of one of the markers, Figs. 8 and 9 are detail views of one of the note markers to represent a note in a space on the staff, Fig. 10 is a rear view of the marker to indicate a flat, and showing the fastening hooks, Fig. 11 is a rear view of the marker to indicate a sharp and showing the fastening hooks.

Like reference characters refer to similar parts throughout the drawings.

In the drawing, the main supporting frame of the abacus is provided with side members 10, 11, a top frame member 12 and a base member 13, a back member 15 serves as a back ground for the staffs to be later described. This back board 15 is removable through the top frame member 12.

At the left side of the abacus and adjacent the frame member 10 is a board 16 upon which may be placed the clef signs as shown in Fig. 1. At the right side of the abacus is a board 17 which serves as a shield for the note markers to be later described. Supports 18 and 19 are attached to the base member and serve to hold the abacus upright when resting upon a table.

At the right side of the abacus are slots 20 and 21 to receive the lower and upper edges of the removable board 22 upon which may be indicated the notes of a miniature keyboard such as of a piano, the notes of the key indications being opposite the lines and spaces, of the staff, to be described. The notes included on this miniature keyboard are those of the grand staff, that is from and including the second $g$ natural below middle $c$, to and including the second $f$ natural above middle $c$.

Extending from the frame member 10 to the frame member 11 are guides and staff line indicators such as pairs of rods 23, which serve to indicate lines of the staff and also to hold the note markers. The middle "C" rods indicated by the reference character 23' on Fig. 1 are preferably painted a distinctive color from the other rods. These rods 23' extend through the board 10 and are provided with knobs 23'' in order that they may be removed, if desired. When the middle C line is removed, the remaining ten lines form the treble and bass staffs.

Note markers 25, 25', respectively, refer to the markers for notes on the staff lines and those in the spaces between the lines or space notes.

The line note markers are attached to the rod representing that line by any suitable manner as by the rod passing through the body of the marker. The space note markers are suspended from the rear rod of the line next above the space they occupy. By this arrangement the movement of the space markers are independent of those of the line markers.

The rods representing the staff lines are preferably made of another shape than cylindrical in order to facilitate the securing of the markers in a vertical plane. In the drawing, I have illustrated them as being square. The markers are preferably in the form of black disks bearing the letters corresponding to the notes to be indicated as shown in Fig. 1. The notes of the different octaves are preferably indicated on the markers with different size or style of letters or with distincitve markings with the letters.

If desired, the note markers may be marked with the name of the note on one side as "do", etc., and the letter on the other or the markers may be made to be reversible and have no note indication on one side for the use of the more advanced students. If desired, the notes of the octave may be designated by the seven primary colors by coloring the note markers in any suitable manner.

It will be seen from an inspection of Fig. 4 that the rear board 15 is cut away and that the note markers when in the right hand position are hidden from view from the front. The purpose of the cut away portion of the rear board 15 is to facilitate the movement of the markers out into a position where they may be seen, it being, of course, desirable to keep them out of sight when not in use. Marker 25$^a$ is provided to indicate flats and marker 25$^b$ is provided to indicate sharps. These markers 25$^a$ and 25$^b$ are provided with hooks to attach them to the rods at the desired places.

The hooks are placed at two levels and a distance apart equal to half the distance between the rod centers. This enables the markers to be placed either on the line or in the space as the case may call for.

Slots 26 and 27 (see Fig. 4) are provided in the side frame members 10 and 11, respectively, to receive a folded sheet of suitable material upon which a full sized keyboard indication is illustrated. This keyboard indication sheet is used by the student to obtain the proper finger position in connection with instruction from the abacus and is conveniently carried, as described, when not in use. A slot 28 (Fig. 1) is provided in the top member 12 through which the back board 15 and the folded keyboard sheet are inserted and removed. The back board 15 may be painted white or any suitable color to, at times, form a back ground.

A handle 30 (Fig. 2) is provided with a wedge shaped member 31 which registers with a correspondingly shaped slot in a block 32 which is secured to the base member 13. This handle 30 is quickly attached and detached and is used when it is desired to hold the abacus in the hand.

In the operation of my device, the note indicators are pushed out on the rods to the desired positions to indicate the desired notes, the abacus being either held in the hand or rested upon a table or piano. The sharp or flat indicators are placed at the proper place and instructions given. When it is desired to make another setting of the markers, it is only necessary to push those, not desired, to the right with a pencil or with the finger and rearrange the indicators to give the desired result.

In case, it is desired to hold the abacus in front of the teacher, to hold the greater attention of the students, the back board 15 is removed. The teacher can then move the indicators from the rear and at the same time, while facing the students, give them instructions and hold their concentrated attention.

While I have shown and described in detail a modification of my invention, I desire to have it understood that I do not limit myself to the exact showing and that modifications and changes may be made without departing from the spirit of my invention and within the scope of the appended claims.

Having described an embodiment of my invention, what I claim as new and desire to secure by Letters Patent is:—

1. A device for teaching musical notation comprising a frame, a series of pairs of rods supported by the frame each pair representing a line of a musical staff, the members of the same pair being mounted adjacent each other, note indicators mounted on the rods and for indicating notes on the staff lines and in the staff spaces, the note indicators for a space being supported by one of a pair of rods and the note indicators for the line being supported by the other rod.

2. A device for teaching musical notation comprising a frame, guides representing the lines of a musical staff, note indicators supported by the guides and movable therealong, a representation of a keyboard of a musical instrument and having its key indications opposite and in registry with the corresponding guides representing the notes of the musical staff.

3. A device for teaching musical notation comprising a frame, pairs of rods mounted thereon and in position to represent the lines of the grand staff, the rods of the staff corresponding to the middle C being removable thereby separating the treble staff from the bass staff.

4. A device for teaching musical notation comprising a frame, rods supported by the frame and in position to represent the lines of a music staff, note indicators mounted on the rods, a detachable back for the frame, and means for detachably holding the back in place.

5. A device for teaching musical notation comprising a frame, guides supported by the frame, note indicators carried by the guides and means for obscuring from view, at the front, those note indicators when not in use.

6. A device for teaching musical notation comprising a frame, non-cylindrical rods mounted on the frame and supported only at their ends in position to represent lines of a music staff, note indicators mounted on the rods movable therealong and being provided with the means for attaching the same to the rods in a non-rotable manner.

In testimony whereof I hereunto affix my signature.

NANCY A. ARMSTRONG.